United States Patent
Inaishi

[11] Patent Number: 6,132,500
[45] Date of Patent: Oct. 17, 2000

[54] HOT-MELT INK

[75] Inventor: Kouji Inaishi, Okazaki, Japan

[73] Assignee: Brother Kogyo Kabushiki Kaisha, Nagoya, Japan

[21] Appl. No.: 09/076,085

[22] Filed: May 12, 1998

[30] Foreign Application Priority Data

May 15, 1997 [JP] Japan ................................. 9-143050

[51] Int. Cl.⁷ .................................................. C09D 11/00
[52] U.S. Cl. ................................. 106/31.31; 106/31.29; 106/31.61; 106/31.63
[58] Field of Search ................... 106/31.31, 31.29, 106/31.61, 31.63

[56] References Cited

U.S. PATENT DOCUMENTS

| | | |
|---|---|---|
| 3,653,932 | 4/1972 | Berry et al. . |
| 4,390,369 | 6/1983 | Merritt et al. . |
| 4,659,383 | 4/1987 | Lin et al. . |
| 4,758,276 | 7/1988 | Lin et al. . |
| 4,820,346 | 4/1989 | Nowak . |
| 5,000,786 | 3/1991 | Matsuzaki . |
| 5,124,719 | 6/1992 | Matsuzaki . |
| 5,397,388 | 3/1995 | Fujioka ................... 106/31.61 |
| 5,405,438 | 4/1995 | Fujioka ................... 106/31.61 |
| 5,409,530 | 4/1995 | Kanbayashi et al. ......... 106/31.61 |
| 5,531,819 | 7/1996 | Sawada ................... 106/31.61 |
| 5,662,736 | 9/1997 | Sakai et al. ............. 106/31.61 |
| 5,669,965 | 9/1997 | Sawada et al. ........... 106/31.61 |
| 5,788,751 | 8/1998 | Sawada ................... 106/31.72 |

FOREIGN PATENT DOCUMENTS

| | | |
|---|---|---|
| 0 654 353 A2 | 5/1995 | European Pat. Off. . |
| 0 676 454 A1 | 10/1995 | European Pat. Off. . |
| 0 819 739 A2 | 1/1998 | European Pat. Off. . |
| 58-108271 | 6/1983 | Japan . |
| 59-22973 | 2/1984 | Japan . |
| 61-83268 | 4/1986 | Japan . |
| 62-48774 | 3/1987 | Japan . |
| 62-295973 | 12/1987 | Japan . |
| 2-29471 | 1/1990 | Japan . |
| 2-167373 | 6/1990 | Japan . |
| 7-102015 | 4/1995 | Japan . |

*Primary Examiner*—Mark L. Bell
*Assistant Examiner*—Veronica F. Faison
*Attorney, Agent, or Firm*—Oliff & Berridge, PLC

[57] ABSTRACT

A hot-melt ink that exhibits good penetration into recording paper, comprises at least one binder and at least one coloring matter dispersed or dissolved therein, and the hot-melt ink, during cooling, exhibits a peak at a temperature of 61° C. or below on a heating/cooling hysteresis curve plotted for the range 40° C. to 150° C. using a differential scanning calorimeter.

12 Claims, 1 Drawing Sheet

HOT-MELT INK

BACKGROUND OF THE INVENTION

1. Field of the Invention

The present invention relates to a hot-melt ink for use in ink-jet recording systems.

2. Related Art of the Invention

Ink-jet recording systems include electric field-controlled systems wherein electrostatic attraction is employed for ink ejection; drop-on-demand systems (pressure pulse systems) wherein the vibrational pressure provided by piezo elements is employed for ink ejection; and thermal ink-jet recording systems wherein the pressure produced by bubbles formed and expanded using high heat is employed for ink ejection. These systems all afford printed images of high detail.

The inks employed in such ink-jet recording systems are ordinarily water-based inks, in which water is the principal solvent, and oil-based inks, in which an organic solvent is the principal solvent. Images printed using water-based inks on the whole have inferior water resistance; in contrast, using oil-based inks it is possible to produce printed images exhibiting excellent water resistance.

Since these water-based inks and oil-based inks are liquid at room temperature, feathering tends to occur when images are printed onto recording paper by use of these inks, and an adequate print density can not be obtained. Because these inks are liquids, they tend to cause the formation of deposits from the inks, whereby the reliability of ink-jet recording systems becomes degraded.

Hot-melt inks, which are solid at ambient temperature, have been proposed as a means for overcoming the drawbacks of the inks pertaining to the prior art, which are liquid at room temperature. U.S. Pat. No. 3,653,932 teaches an ink containing a dialkyl ester of sebacic acid. U.S. Pat. No. 4,390,369 and Japanese Patent Application Laid-Open No. 58-108271 teach inks containing natural waxes. Japanese Patent Application Laid-Open No. 59-22973 teaches an ink containing stearic acid, while Japanese Patent Application Laid-Open No. 61-83268 teaches an ink containing an acid or alcohol with 20 to 24 carbon atoms and a ketone having a relatively high melting point. Japanese Patent Application Laid-Open No. 62-48774 teaches an ink containing a thermosetting resin that has a high hydroxyl value, a solid organic solvent with a melting above 150° C., and a small quantity of dyestuff. Japanese Patent Application Laid-Open No. 2-167373 teaches an ink containing coloring matter, a first solvent that is solid at room temperature and that liquefies when heated to a temperature above room temperature, and a second solvent that dissolves the first solvent and that is a highly volatile liquid at room temperature. Japanese Patent Application Laid-Open No. 62-295973 teaches an ink containing a synthetic wax that has polar groups and a dye which is soluble in this synthetic wax. Japanese Patent Application Laid-Open No. 2-29471 teaches an ink containing ketones, amide waxes, waxes, and coloring matter.

Hot-melt inks, which are solid at ambient temperature, are heated, ejected onto an image recording medium such as recording paper, caused to penetrate into the image recording medium (which is ordinarily maintained in a heated state by a platen or the like), and fixed thereon. If penetration is poor, fixation properties will be poor as well, and the ink dot profile projects above the image recording medium surface to a greater extent than necessary. Where the ink dots project above the image recording medium surface to a greater extent than necessary, the top portions thereof become susceptible to being shaved off, and abrasion resistance accordingly deteriorates. Shaving off of the top portions of the ink dots degrades the color of the printed image. On the other hand, if the degree of penetration is too high, feathering may result, causing the ink to fail to fulfill its basic function, printed pages may stick together, and other problems may occur, The known hot-melt inks described above do not exhibit adequate penetration into recording paper, and thus have poor fixation to recording paper and poor abrasion resistance.

SUMMARY OF THE INVENTION

The present invention was developed in order to overcome the aforementioned problems, and has as an object to provide a hot-melt ink that exhibits good penetration into recording paper.

The aforementioned object is achieved through a hot-melt ink comprising at least one binder and at least one coloring matter dispersed or dissolved therein, wherein the hot-melt ink, during cooling, exhibits a peak at a temperature of 61° C. or below on a heating/cooling hysteresis curve plotted for the range 40° C. to 150° C. using a differential scanning calorimeter (DSC).

This and other objects, features and advantages of the present invention are described in or will become apparent from the following detailed description of the invention.

DETAILED DESCRIPTION OF THE INVENTION

Figure 1:
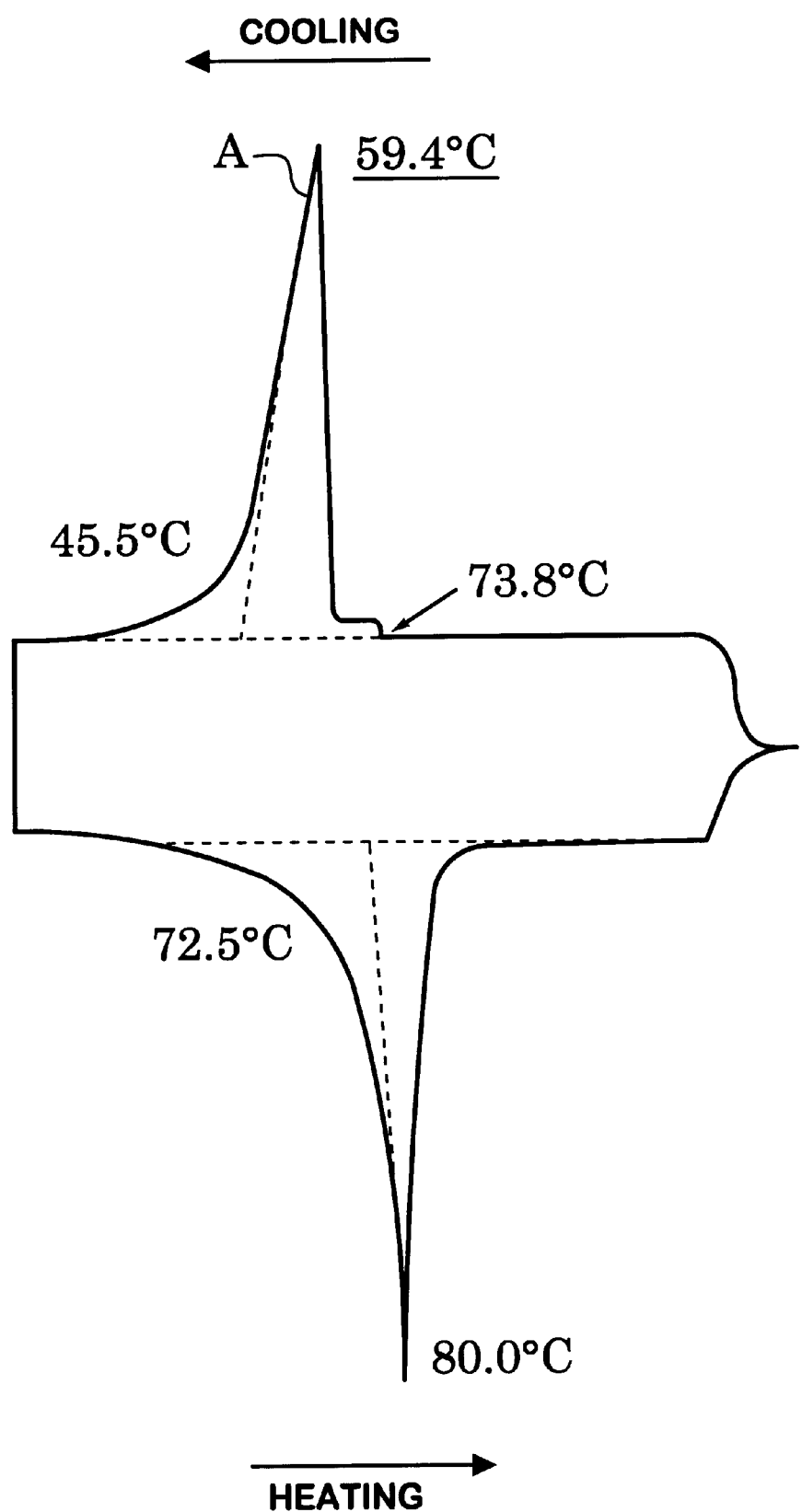
FIG. 1 is a chart of the DSC plot of the yellow of Example 2 during heating and cooling.

The hot-melt ink of the present invention comprises at least one binder and at least one coloring matter dispersed or dissolved therein, wherein the hot-melt ink exhibits during cooling a peak at a temperature (hereinafter termed "peak temperature") of 61° C. or below on a heating/cooling hysteresis curve plotted for the range 40° C. to 150° C. using a differential scanning calorimeter (DSC). Above 61° C., penetration into the recording paper is inadequate, and ink fixation properties and abrasion resistance are poor. In order to prevent printed pages of recording paper from sticking together, the aforementioned peak temperature should be at least 50° C.

FIG. 1 gives a DSC heating/cooling hysteresis curve plotted under the conditions described above for an approximately 5 mg sample of the yellow ink of Practical Example 2 (described later) using a differential scanning calorimeter DSC 220C (manufactured by Seiko Denshi Kogyo, SSC 5220 Analysis System). In FIG. 1, the temperature at which peak A appears during cooling is the peak temperature referred to earlier.

The aforementioned relationship, i.e., that the extent of penetration into recording paper of the aforementioned hot-melt ink is particularly dependent upon the temperature at which peak A appears during cooling on a heating/cooling hysteresis curve of FIG. 1, was discovered by the inventors and represents the basis on which the present invention was perfected.

The hot-melt ink of the present invention, with the proviso that the peak temperature is within the range specified above, comprises at least one binder such as amide resins or waxes, and at least one coloring matter such as pigments or dyes, and may additionally include an antioxidant and the like.

There are no particular restrictions regarding the aforementioned amide resins. Specific Examples of the amide resins include BIRTHAMIDE 335 and 725 (manufactured by Henkel Hakusui Corporation), TOHMIDE 90 and 92 (manufactured by Fuji Kasei Kogyo Co., Ltd.), SUNMIDE 550 and 55 (manufactured by Sanwa Kagaku Kogyo K.K.), and other commercially available products. These may be used individually or in combinations of two or more.

There are no particular restrictions regarding the aforementioned waxes. Examples of the waxes include paraffin wax, microcrystalline wax, and other petroleum waxes; candelilla wax, carnauba wax, rice wax, solid jojoba wax, and other vegetable-derived waxes; beeswax, lanolin, spermaceti wax, and other animal-derived waxes; montan wax and other mineral waxes; Fischer-Tropsch wax, polyethylene wax, and other synthetic hydrocarbon waxes; hardened castor oil, hardened castor oil derivatives, and other hydrogenated waxes; montan wax derivatives, polyethylene wax derivatives, and other modified waxes; behenic acid, stearic acid, palmitic acid, myristic acid, lauric acid, and other higher fatty acids; stearyl alcohol, behenyl alcohol, and other higher alcohols; 12-hydroxystearic acid, 12-hydroxystearic acid derivatives, and other hydroxystearic acids; dodecylamine, tetradecylamine, octadecylamine, and other amines; methyl stearate, octadecyl stearate, glycerol fatty acid esters, sorbitan fatty acid esters, propylene glycol fatty acid esters, ethylene glycol fatty acid esters, polyoxyethylene fatty acid esters, and other esters; and a-olefin-maleic anhydride copolymer waxes and other polymer waxes.

Ketone waxes and monoamide waxes are favorable for use as the aforementioned wax.

There are no particular restrictions regarding the aforementioned ketone waxes. Examples of the ketone waxes include stearones such as T-1 (manufactured by Kao Corp.) and laurones such as LAURONE (manufactured by Kanto Kagaku Co., Ltd.). These may be used individually or in combinations of two or more.

There are no particular restrictions regarding the aforementioned monoamide waxes. Examples of the monoamide waxes include lauric acid amide, stearic acid amide, stearyl stearic acid amide, oleic acid amide, erucic acid amide, ricinoleic acid amide, 12-hydroxystearic acid amide, special fatty acid amides, N-substituted fatty acid amides, and the like. Specific examples thereof are NIKKAMIDE S, NIKKAMIDE SE, SLLPACKS O (manufactured by Nihon Kasei Chemical Co., Ltd.), and the like. These may be used individually or in combinations of two or more.

There are no particular restrictions regarding the antioxidants. Examples of the antioxidants include IRGANOX 1010 (manufactured by Ciba-Geigy Corp.) and the like.

There are no particular restrictions regarding the coloring matter, with the proviso that it is at least one of pigments and dyes used in oil-based ink compositions of the prior art.

There are no particular restrictions regarding the aforementioned pigments. Any pigments commonly used in the field of printing, either organic or inorganic, may be employed. Examples of the pigments include carbon black, cadmium red, molybdenum red, chrome yellow, cadmium yellow, titan yellow, chromium oxide, viridian, titan cobalt green, ultramarine blue, Prussian blue, cobalt blue, azo pigments, phthalocyanine pigments, quinacridone pigments, isoindolinone pigments, dioxazine pigments, threne pigments, perylene pigments, perinone pigments, thioindigo pigments, quinophthalone pigments, metal complex pigments, and the like. These may be used individually or in combinations of two or more.

There are no particular restrictions regarding the aforementioned dyes. Examples of the dyes include azo dyes, disazo dyes, metal complex salt dyes, naphthol dyes, anthraquinone dyes, indigo dyes, carbonium dyes, quinoneimine dyes, cyanine dyes, quinoline dyes, nitro dyes, nitroso dyes, benzoquinone dyes, naphthoquinone dyes, xanthene dyes, phthalocyanine dyes, metal phthalocyanine dyes, and other oil-soluble dyes. These may be used individually or in combinations of two or more. They may also be used in conjunction with the pigments listed above.

The hot-melt ink of the present invention may additionally contain other common additives used in hot-melt inks, such as ultraviolet absorbers and the like.

The hot-melt ink of the present invention can be prepared by heating and melting the amide resin and other suitable wax, etc., to 70 to 250° C. (preferably 100 to 200° C.), stirring and mixing at 200 to 10,000 rpm (preferably 500 to 5000 rpm) using a dissolver or other stirring device, and then filtering the resultant ink composition through a mesh filter or the like.

EXAMPLES

The present invention will be illustrated in further detail below through the following working examples. The present invention should not be limited to the examples.

Example 1

Yellow, magenta, cyan, and black hot-melt inks were prepared in the mixture ratios indicated below. The peak temperatures of the resultant hot-melt inks were plotted using a DSC. Results are presented in Table 1.

| Yellow | |
|---|---|
| Amide resin (Birthamide 335, manufactured by Henkel Japan) | 23 parts by weight |
| Ketone wax (T-1, manufactured by Kao Corporation) | 40 parts by weight |
| Amide wax (SLlPACKS O, manufactured by Nihon Kasei Chemical Co., Ltd.) | 35 parts by weight |
| Azo dye (Yellow 075, manufactured by BASF Co.) | 2 parts by weight |
| Magenta | |
| Amide resin (Birthamide 335, manufactured by Henkel Japan) | 23 parts by weight |
| Ketone wax (T-1, manufactured by Kao Corporation) | 40.5 parts by weight |
| Amide wax (SLlPACKS O, manufactured by Nihon Kasei Chemical Co., Ltd.) | 35 parts by weight |
| Xanthene dye (Neptune Red 543, manufactured by BASF Corporation) | 2.5 parts by weight |
| Cyan | |
| Amide resin (Birthamide 335, manufactured by Henkel Japan) | 23 parts by weight |
| Ketone wax (T-1, manufactured by Kao Corporation) | 37 parts by weight |
| Amide wax (SLlPACKS O, manufactured by Nihon Kasei Chemical Co., Ltd.) | 37 parts by weight |
| Phthalocyamine dye (Orasol Blue GL, manufactured by Ciba-Geigy Corporation) | 3 parts by weight |

-continued

Black

| | |
|---|---|
| Amide resin (Birthamide 335, manufactured by Henkel Japan) | 26 parts by weight |
| Ketone wax (T-1, manufactured by Kao Corporation) | 49 parts by weight |
| Amide wax (SLIPACKS O, manufactured by Nihon Kasei Chemical Co., Ltd.) | 21 parts by weight |
| Azo dye (Bali Fast Black 3810, manufactured by Orient Chemical Industry Ltd.) | 4 parts by weight |

TABLE 1

| | Yellow | Magenta | Cyan | Black |
|---|---|---|---|---|
| Peak temperature (° C.) | 58.3 | 58.9 | 56.3 | 60.6 |

Example 2

Yellow, magenta, cyan, and black hot-melt inks were prepared in accordance with the mixture ratios indicated below. The peak temperatures of the resultant hot-melt inks were plotted using a DSC. Results are presented in Table 2.

Yellow

| | |
|---|---|
| Amide resin (Birthamide 335, manufactured by Henkel Japan) | 20 parts by weight |
| Ketone wax (T-1, manufactured by Kao Corporation) | 48 parts by weight |
| Amide wax (SLIPACKS O, manufactured by Nihon Kasei Chemical Co., Ltd.) | 30 parts by weight |
| Azo dye (Yellow 075, manufactured by BASF Co.) | 2 parts by weight |

Magenta

| | |
|---|---|
| Amide resin (Birthamide 335, manufactured by Henkel Japan) | 21 parts by weight |
| Ketone wax (T-1, manufactured by Kao Corporation) | 49 parts by weight |
| Amide wax (SLIPACKS O, manufactured by Nihon Kasei Chemical Co., Ltd.) | 28.5 parts by weight |
| Xanthene dye (Neptune Red 543, manufactured by BASF Co.) | 1.5 parts by weight |

Cyan

| | |
|---|---|
| Amide resin (Birthamide 335, manufactured by Henkel Japan) | 24 parts by weight |
| Ketone wax (T-1, manufactured by Kao Corporation) | 49 parts by weight |
| Amide wax (SLIPACKS O, manufactured by Nihon Kasei Chemical Co., Ltd.) | 24 parts by weight |
| Phthalocyamine dye (Orasol Blue GL, manufactured by Ciba-Geigy Corporation) | 3 parts by weight |

Black

| | |
|---|---|
| Amide resin (Birthamide 335, manufactured by Henkel Japan) | 16 parts by weight |
| Ketone wax (T-1, manufactured by Kao Corporation) | 49 parts by weight |
| Amide wax (SLIPACKS O, manufactured by Nihon Kasei Chemical Co., Ltd.) | 31 parts by weight |
| Azo dye (Bali Fast Black 3810, manufactured by Orient Chemical Industry Ltd.) | 4 parts by weight |

TABLE 2

| | Yellow | Magenta | Cyan | Black |
|---|---|---|---|---|
| Peak temperature (° C.) | 59.4 | 60.3 | 59.3 | 60.2 |

Comparative Example 1

Yellow, magenta, cyan, and black hot-melt inks were prepared in accordance with the mixture ratios indicated below. The peak temperatures of the resultant hot-melt inks were plotted using a DSC. Results are presented in Table 3.

Yellow

| | |
|---|---|
| Amide resin (Birthamide 335, manufactured by Henkel Japan) | 32 parts by weight |
| Ketone wax (T-1, manufactured by Kao Corporation) | 46 parts by weight |
| Amide wax (SLIPACKS O, manufactured by Nihon Kasei Chemical Co., Ltd.) | 20 parts by weight |
| Azo dye (Yellow 075, manufactured by BASF Co.) | 2 parts by weight |

Magenta

| | |
|---|---|
| Amide resin (Birthamide 335, manufactured by Henkel Japan) | 32 parts by weight |
| Ketone wax (T-1, manufactured by Kao) | 45.5 parts by weight |
| Amide wax (SLIPACKS O, manufactured by Nihon Kasei Chemical Co., Ltd.) | 20 parts by weight |
| Xanthene dye (Neptune Red 543, manufactured by BASF Co.) | 2.5 parts by weight |

Cyan

| | |
|---|---|
| Amide resin (Birthamide 335, manufactured by Henkel Japan) | 35.5 parts by weight |
| Ketone wax (T-1, manufactured by Kao Corporation) | 48.5 parts by weight |
| Amide wax (SLIPACKS O, manufactured by Nih on Kasei Chemical Co., Ltd) | 13 parts by weight |
| Phthalocyamine dye (Orasol Blue GL, manufactured by Ciba-Geigy Corporation) | 3 parts by weight |

Black

| | |
|---|---|
| Amide resin (Birthamide 335, manufactured by Henkel Japan) | 27.5 parts by weight |
| Ketone wax (T-1 manufactured by Kao Corporation) | 49.5 parts by weight |
| Amide wax (SLIPACKS O, manufactured by Nihon Kasei Chemical Co., Ltd.) | 19 parts by weight |
| Azo dye (Balifast Black 3810, manufactured by Orient Chemical Industry Ltd.) | 4 parts by weight |

TABLE 3

|  | Yellow | Magenta | Cyan | Black |
|---|---|---|---|---|
| Peak temperature (° C.) | 61.9 | 62.3 | 61.2 | 63.2 |

The hot-melt inks prepared in Examples 1 and 2 and in Comparative Example 1 were printed onto recording paper using a hot-melt ink-jet printer (manufactured by Brother Kogyo Kabushiki Kaisha).

The hot-melt inks prepared in Examples 1 and 2 exhibited satisfactory penetration into the recording paper and excellent fixing properties. In contrast, the hot-melt ink prepared in Comparative Example 1 exhibited inadequate penetration into the recording paper and poor fixing properties.

Abrasion resistance tests were conducted on the printed paper using a 3 track ball of a 30mm diameter provided with a 1000 g weight.

Scratch marks are ordinarily quite noticeable in black areas and not very noticeable in yellow areas. Virtually no scratch marks were visible in any of the four colors in Practical Examples 1 and 2, demonstrating that the hot-melt ink of the present invention is suitable as an ink for full-color printers.

In contrast, scratch marks were visible in all four colors in Comparative Example 1.

The hot-melt ink of the present invention, having the constitution described above, exhibits good penetration of recording paper. It also exhibits excellent fixing properties and abrasion resistance.

The entire disclosure of the specification, claims and summary of Japanese Patent Application No. 9-143050 filed on May 15, 1997 is herein incorporated by reference in its entirety.

What is claimed is:

1. A hot-melt ink comprising:
   at least one binder; and
   at least one coloring matter dispersed or dissolved in the binder,
   wherein the hot-melt ink exhibits, during cooling, a peak at a temperature of 61° C. or below on a heating/cooling hysteresis curve plotted for the range of 40° C. to 150° C. using a differential scanning calorimeter.

2. The hot-melt ink according to claim 1, wherein the hot-melt ink exhibits, during cooling, a peak at a temperature of 50° C. or above on a heating/cooling hysteresis curve plotted for the range 40° C. to 150° C. using a differential scanning calorimeter.

3. The hot-melt ink according to claim 1, wherein the binder comprises at least one of amide resins and waxes.

4. The hot-melt ink according to claim 3, wherein the wax comprises at least one of Ketone waxes and monoamide waxes.

5. The hot-melt ink according to claim 4, wherein the ketone wax comprises at least one of stearones and laurones.

6. The hot-melt ink according to claim 4, wherein the monoamide wax comprises at least one of lauric acid amide, stearic acid amide, stearyl stearic acid amide, oleic acid amide, erucic acid amide, ricinoleic acid amide, 12-hydroxystearic acid amide, specialty fatty acid amides, and N-substituted fatty acid amides.

7. A hot-melt ink comprising:
   at least two binders; and
   at least one coloring matter dispersed or dissolved in the at least two binders,
   wherein the hot-melt ink exhibits, during cooling, a peak at a temperature of 61° C. or below on a heating/cooling hysteresis curve plotted for the range of 40° C. to 150° C. using a differential scanning calorimeter.

8. The hot-melt ink according to claim 7, wherein the at least two binders comprise at least one amide resin and at least one wax.

9. The hot-melt ink according to claim 7, wherein the at least two binders comprise at least one amide resin, at least one ketone wax and at least one monoamide wax.

10. The hot-melt ink according to claim 9, wherein the hot-melt ink exhibits, during cooling, a peak at a temperature of 50° C. or above on a heating/cooling hysteresis curve plotted for the range of 40° C. to 150° C. using a differential scanning calorimeter.

11. The hot-melt ink according to claim 8, wherein the hot-melt ink exhibits, during cooling, a peak at a temperature of 50° C. or above on a heating/cooling hysteresis curve plotted for the range of 40° C. to 150° C. using a differential scanning calorimeter.

12. The hot-melt ink according to claim 7, wherein the hot-melt ink exhibits, during cooling, a peak at a temperature of 50° C. or above on a heating/cooling hysteresis curve plotted for the range of 40° C. to 150° C. using a differential scanning calorimeter.

* * * * *